(12) United States Patent
Kobayashi et al.

(10) Patent No.: US 10,538,852 B2
(45) Date of Patent: Jan. 21, 2020

(54) PLATED STEEL SHEET AND METHOD PRODUCING SAME

(71) Applicant: NIPPON STEEL & SUMITOMO METAL CORPORATION, Tokyo (JP)

(72) Inventors: Akinobu Kobayashi, Tokyo (JP); Yasuto Goto, Tokyo (JP); Takashi Futaba, Tokyo (JP); Kenichiro Matsumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 95 days.

(21) Appl. No.: 15/564,980

(22) PCT Filed: Apr. 13, 2016

(86) PCT No.: PCT/JP2016/061955
§ 371 (c)(1),
(2) Date: Oct. 6, 2017

(87) PCT Pub. No.: WO2016/167304
PCT Pub. Date: Oct. 20, 2016

(65) Prior Publication Data
US 2018/0073157 A1   Mar. 15, 2018

(30) Foreign Application Priority Data

Apr. 14, 2015   (JP) ................. 2015-082266

(51) Int. Cl.
*B32B 15/00* (2006.01)
*C25D 5/50* (2006.01)
(Continued)

(52) U.S. Cl.
CPC .............. *C25D 5/50* (2013.01); *B32B 15/015* (2013.01); *C22C 19/05* (2013.01); *C22C 27/06* (2013.01);
(Continued)

(58) Field of Classification Search
None
See application file for complete search history.

(56) References Cited

U.S. PATENT DOCUMENTS

| 4,891,274 A | 1/1990 | Higuchi et al. |
| 2015/0167131 A1* | 6/2015 | Bullard ................... C22C 38/18 |
| | | 428/610 |

FOREIGN PATENT DOCUMENTS

| CN | 101904228 A | 12/2010 |
| JP | 61-41760 A | 2/1988 |
| (Continued) | | |

OTHER PUBLICATIONS

Office Action dated Dec. 5, 2018, in Chinese Patent Application No. 201680021220.X, with English translation.
(Continued)

*Primary Examiner* — Seth Dumbris
*Assistant Examiner* — Kim S. Horger
(74) *Attorney, Agent, or Firm* — Birch, Stewart, Kolasch & Birch, LLP (57) ABSTRACT

A plated steel sheet including an alloy plating layer formed on a surface of the steel sheet consisting of, in mass %, Cr: 5 to 91%, Fe: 0.5 to 10%, and the balance: Ni and unavoidable impurities, the Ni concentration gradually decreases from an outermost surface of the alloy plating layer to a side of the steel sheet, Ni/Cr>1 in an area extending 300 nm or more from the outermost surface of the alloy plating layer, the Fe concentration in the alloy plating layer gradually decreases from the side of the steel sheet to the outermost surface, the Fe concentration in the outermost surface 0.5% or less, the total thickness of an alloy layer formed in the alloy plating layer and containing Cr and Fe is 500 to 2000 nm, and the total amount of the alloy plating layer deposited to the steel sheet is 4.5 to 55.5 g/m$^2$.

8 Claims, 1 Drawing Sheet

(51) Int. Cl.
    *C22C 27/06*     (2006.01)
    *C22C 19/05*     (2006.01)
    *B32B 15/01*     (2006.01)
    *C25D 3/04*     (2006.01)
    *C25D 3/12*     (2006.01)
    *C25D 5/14*     (2006.01)

(52) U.S. Cl.
    CPC ................. *C25D 3/04* (2013.01); *C25D 3/12* (2013.01); *C25D 5/14* (2013.01)

(56) References Cited

FOREIGN PATENT DOCUMENTS

| | | |
|---|---|---|
| JP | 1-195268 A | 8/1989 |
| JP | 1-287280 A | 11/1989 |
| JP | 4-72091 A | 3/1992 |
| JP | 7-310166 A | 11/1995 |
| JP | 7-310167 A | 11/1995 |
| JP | 2014-77175 A | 5/2014 |
| JP | 2015-183290 A | 10/2015 |

OTHER PUBLICATIONS

International Search Report for PCT/JP2016/061955 dated May 17, 2016.
Office Action for TW 105111639 dated Dec. 9, 2016.
Written Opinion of the International Searching Authority for PCT/JP2016/061955 (PCT/ISA/237) dated May 17, 2016.
Extended European Search Report dated Sep. 21, 2018, in European Patent Application No. 16780095.2.

\* cited by examiner

PLATED STEEL SHEET AND METHOD PRODUCING SAME

TECHNICAL FIELD

The present invention relates to a plated steel sheet and a method for producing the same.

BACKGROUND ART

Stainless steel sheets have been widely used as heat-resistant uses. For example, stainless steel is used in an exhaust system of an automobile, which is required to have corrosion resistance performance in a high-temperature corrosive environment. Since stainless steel is expensive, replacement with aluminum plating, which is less expensive and is excellent in heat resistance, is pursued; however, since aluminum plating has only insufficient corrosion resistance in an environment in which it is exposed to NOx and SOx, such as around a muffler, most of the materials are still stainless steel.

Thus, the present inventors have worked toward the development of heat-resistant Ni—Cr alloy plating using Ni and Cr that does not dissolve in nitric acid or sulfuric acid, with the purpose of providing a material that is inexpensive and is excellent in high-temperature corrosion resistance and corrosion resistance in NOx and SOx environments, and that can take the place of stainless steel.

As methods for producing Ni—Cr alloy plating, various technologies of performing thermal diffusion treatment on two-layer plating of Cr and Ni are disclosed.

For example, Patent Literature 1 mentions that Cr plating is performed on a steel sheet in the first place and Ni plating is performed on the Cr plating, then the steel sheet is heat-treated in a non-oxidizing atmosphere at 600° C. to 910° C. for 60 seconds to 20 hours, and thereby a component that is made to resemble 18-8 stainless steel is obtained. Further, Patent Literature 2 mentions that Cr plating and Ni plating are performed on a steel sheet, then the steel sheet is heat-treated in a molten salt bath at 750 to 900° C. for 1 to 4 hours, and thereby a component that is made to resemble 18-8 stainless steel is obtained. Further, Patent Literature 3 mentions that Cr plating is performed on a steel sheet in the first place and Ni plating is performed on the Cr plating, then the steel sheet is heat-treated, and thereby plating including a Ni—Cr alloy layer and a Cr—Fe—Ni alloy layer is obtained.

CITATION LIST

Patent Literature

Patent Literature 1: JP H7-310166A
Patent Literature 2: JP S61-41760A
Patent Literature 3: JP H4-72091A

SUMMARY OF INVENTION

Technical Problem

However, the technologies described in Patent Literatures 1 and 2 above have the problem that heat treatment for a long time is needed in order to obtain the target composition, and hence productivity is low. Furthermore, Fe is diffused up to the surface of the plating by performing thermal diffusion for a long time; consequently, when the product is then exposed to a high-temperature oxidizing atmosphere, oxidization occurs form the Fe diffused to the surface as a starting point.

Patent Literature 2 mentions that, in the first place, a Cr covering is formed with a plating thickness of 4 to 15 μm by the electroplating method. However, due to the fact that Cr plating has low cathodic current efficiency, there is a disadvantage that a high treatment current density and a long electrolytic cell are needed in order to provide such thick plating by the electroplating method, and hence equipment costs are high and productivity is low.

On the other hand, in the method described in Patent Literature 3, the deposited amount of Cr plating is as small as 0.01 to 0.2 g/m$^2$, and there is no problem with equipment costs or productivity. However, since the amount of Cr is small and Cr is not uniformly electrodeposited on the steel sheet, there is a disadvantage that not only Cr—Fe but also Fe—Ni is produced at the plating interface, and the Fe—Ni plating portion peels off in a high-temperature oxidizing atmosphere or Fe diffuses to the plating surface; consequently, oxidation proceeds from these portions as starting points.

As above, the technologies disclosed in the past have so far failed to obtain sufficient heat resistance performance, or have the problem that productivity is very low.

Thus, the present invention has been made in view of the problems mentioned above, and an object of the present invention is to provide a plated steel sheet excellent in heat resistance and productivity and a method for producing the same.

Solution to Problem

In order to solve the above problems, according to an aspect of the present invention, there is provided a plated steel sheet including: a steel sheet; and an alloy plating layer formed on a surface of the steel sheet, in which the alloy plating layer consists of, in mass %, Cr: 5 to 91%, Fe: 0.5 to 10%, and the balance: Ni and unavoidable impurities, the Ni concentration in the alloy plating layer gradually decreases from an outermost surface of the alloy plating layer to a side of the steel sheet, the ratio of the Ni concentration to the Cr concentration is Ni/Cr>1 in an area extending 300 nm or more from the outermost surface of the alloy plating layer, the Fe concentration in the alloy plating layer gradually decreases from the side of the steel sheet to the outermost surface of the alloy plating layer, the Fe concentration in the outermost surface of the alloy plating layer is 0.5% or less, the total thickness of an alloy layer formed in the alloy plating layer and containing Cr and Fe is 500 to 2000 nm, and the total amount of the alloy plating layer deposited to the steel sheet is 4.5 to 55.5 g/m$^2$.

Here, the deposited amount of Cr plating in the alloy plating layer may be 3.5 to 28.8 g/m$^2$, the deposited amount of Ni plating in the alloy plating layer may be 3.0 to 26.7 g/m$^2$, and the ratio of the deposited amount of Cr/Ni plating in the alloy plating layer may be 0.9 to 5.0.

Further, conditions (a) and (b) below may be satisfied,
(a) the deposited amount of Cr plating of a Cr plating layer is more than 3.5 g/m$^2$ and 28.8 g/m$^2$ or less, and
(b) at least one of a condition that the deposited amount of Ni plating on the Ni plating layer be 5.0 to 10.0 g/m$^2$ and a condition that the ratio of the deposited amount of Cr/Ni plating be 1.2 to 3.0 is satisfied.

The components in an area extending 10 nm in depth from the outermost surface of the alloy plating layer may be, in mass %, 0 to 35% of Cr, 65 to 100% of Ni, and 0.5% or less of Fe.

The alloy plating layer may include a Ni—Cr alloy layer.

The alloy plating layer may include a Ni layer on a Ni—Cr alloy layer.

The total thickness of the Cr—Fe-containing alloy layer may be 300 nm or more.

According to another aspect of the present invention, there is provided a method for producing a plated steel sheet that produces the plated steel sheet, the method including: a step of performing Cr plating with a surface density of 1.5 to 28.8 g/m² on one surface or both surfaces of a steel sheet and thereby forming a Cr plating layer on the one surface or both surfaces of the steel sheet; a step of performing Ni plating with a surface density of 3 to 26.7 g/m² on the Cr plating layer and thereby forming a Ni plating layer on the Cr plating layer; and a step of holding the steel sheet on which the Cr plating layer and the Ni plating layer are formed at a temperature of 600° C. to 900° C. for a time more than 0 seconds and 60 seconds or less in a non-oxidizing atmosphere or a reducing atmosphere.

Here, the deposited amount of Cr plating of the Cr plating layer may be 3.5 to 28.8 g/m², the deposited amount of Ni plating of the Ni plating layer may be 3.0 to 26.7 g/m², and the ratio of the deposited amount of Cr/Ni plating may be 0.9 to 5.0.

Further, conditions (a) and (b) below may be satisfied, (a) the deposited amount of Cr plating of the Cr plating layer is more than 3.5 g/m² and 28.8 g/m² or less, and (b) at least one of a condition that the deposited amount of Ni plating of the Ni plating layer be 5.0 to 10.0 g/m² and a condition that the ratio of the deposited amount of Cr/Ni plating be 1.2 to 3.0 is satisfied.

Advantageous Effects of Invention

A plated steel sheet according to the present invention is excellent in heat resistance and productivity.

DESCRIPTION OF EMBODIMENTS

<1. Overall Configuration of Plated Steel Sheet>

A plated steel sheet according to the present embodiment includes a steel sheet and an alloy plating layer formed on the steel sheet. The steel sheet usable in the present embodiment is not particularly limited, and a commonly known steel sheet such as a hot rolled steel sheet or a cold rolled steel sheet may be used. For the steel type, Al-killed steel, ultralow carbon steel to which Ti, Nb, or the like is added, and high-tensile steel in which an element such as P, Si, or Mn is added to these may be used. The steel sheet is preferably a cold rolled steel sheet. The alloy plating layer has the characteristic configuration described below. Thus, the plated steel sheet according to the present embodiment has high heat resistance and productivity.

<2. Configuration of Alloy Plating Layer>

Next, the configuration of the alloy plating layer according to the present embodiment is described in detail. The alloy plating layer consists of, in mass %, Cr: 5 to 91%, Fe: 10% or less, and the balance: Ni and unavoidable impurities.

In the following description, unless otherwise stated, the concentration of each component represents the concentration in mass %. Further, unless otherwise stated, the concentration of each component represents the concentration of the component existing in the entire area in the thickness direction of the alloy plating layer. The concentration of each component can be measured by glow discharge spectroscopy (GDS). Since the alloy plating layer contains such components, a Ni—Cr alloy layer excellent in heat resistance and a Cr—Fe alloy layer excellent in adhesiveness to the steel sheet are formed in the alloy plating layer. The alloy plating layer includes these alloy layers, and satisfies the conditions described later. Thereby, the plated steel sheet according to the present embodiment exhibits excellent heat resistance and corrosion resistance. Furthermore, the plated steel sheet needs only short time for heat treatment, that is, only short holding time, and is therefore excellent also in productivity. The heat treatment is described later.

In the case where the Cr concentration in the alloy plating layer is less than 5%, a Ni—Cr alloy layer is not sufficiently formed in the alloy plating layer. Consequently, the target heat resistance cannot be obtained. In the case where the Cr concentration is more than 91%, it is difficult to ensure 300 nm or more of an area where Ni/Cr>1, and consequently the fault described later may occur. In the case where the Fe concentration in the alloy plating layer is more than 10%, the oxidation of the alloy plating layer proceeds from Fe in the alloy plating layer as a starting point, and consequently the heat resistance and the corrosion resistance of the plated steel sheet are reduced.

The Ni concentration in the alloy plating layer gradually decreases from the outermost surface (exposed surface) of the alloy plating layer to the steel sheet side. The ratio of the Ni concentration to the Cr concentration is Ni/Cr>1 in an area extending 300 nm or more from the outermost surface of the alloy plating layer.

The oxidation of the plated steel sheet under high temperature is suppressed by the alloy plating layer having the configuration mentioned above. That is, heat resistance is improved. In the case where the thickness of the area where Ni/Cr>1 is less than 300 nm, Cr is likely to be exposed on the outermost surface of the alloy plating layer. The Cr exposed on the outermost surface may absorb oxygen and nitrogen in the air under high temperature, and may embrittle. That is, the Cr exposed on the outermost surface may impair the heat resistance of the plated steel sheet. The thickness of the area where Ni/Cr>1 is preferably 1000 nm or more, and more preferably 2000 nm or more. In the case where the thickness of the area where Ni/Cr>1 is more than 5000 nm, electrodeposition of a large amount of Ni plating is needed, or long-time heating is needed in the production process; hence, this is not economical. Thus, the thickness of the area is preferably 5000 nm or less.

The Fe concentration (mass %) in the alloy plating layer gradually decreases from the steel sheet side to the outermost surface of the alloy plating layer. The Fe concentration in the outermost surface of the alloy plating layer is 0.5% or less. Specifically, the Fe concentration in an area in a range of 10 nm in depth from the outermost surface of the alloy plating layer is 0.5% or less. If Fe is present at more than 0.5% in the outermost surface of the alloy plating layer, the oxidation of the alloy plating layer proceeds from Fe of the outermost surface as a starting point, and consequently the corrosion resistance and the heat resistance of the plated steel sheet may be reduced. The Fe concentration in the plating outermost surface is more preferably 0.1% or less.

In the alloy plating layer, an alloy layer containing Cr and Fe (hereinafter, occasionally referred to as "Cr—Fe-containing alloy layer") is formed. The Cr—Fe-containing alloy layer is formed near the interface between the alloy plating layer and the steel sheet. Examples of the Cr—Fe-containing alloy layer include a Cr—Fe alloy layer and a Ni—Cr—Fe alloy layer. Of these, either one may be formed in the alloy plating layer, or both may be formed in the alloy plating layer. The total thickness of the Cr—Fe-containing alloy layer (in the case where a plurality of kinds of Cr—Fe-containing alloy layers are formed, the total thickness of these) is 500 nm or more and 2000 nm or less. The Cr—Fe-containing alloy layer can enhance the adhesiveness between the steel sheet and the alloy plating layer. In the case where the thickness of the Cr—Fe-containing alloy layer is less than 500 nm, the adhesiveness between the alloy plating layer and the steel sheet is not sufficient.

In the case where the Cr—Fe-containing alloy layer is too thick, Fe in the alloy plating layer is, in a heat-resistant environment, likely to diffuse to the outermost surface of the alloy plating layer. The diffusion of Fe is lessened by increasing the Cr concentration in the alloy plating layer. However, increasing the Cr concentration is not desirable in terms of economy and environment. Thus, the total thickness of the Cr—Fe-containing alloy layer needs to be set to 2000 nm or less from the viewpoints of the ensuring of stable heat resistance performance, economy, and environment.

The total amount of the alloy plating layer deposited to the steel sheet (hereinafter, occasionally referred to as "the deposited amount of alloy plating") is 4.5 to 55.5 g/m$^2$. In the case where the deposited amount of alloy plating is less than 4.5 g/m$^2$, it is difficult to ensure sufficient heat resistance. The deposited amount of alloy plating is preferably 10 g/m$^2$ or more from the viewpoint of enhancing the heat resistance of the plated steel sheet. If the deposited amount of alloy plating is more than 55.5 g/m$^2$, only a reduction in productivity and an increase in cost are brought about, and no improvement in performance is exhibited. It is preferable that Cr be contained at a concentration of 0 to 35%, Ni at 65 to 100%, and Fe at 0.5% or less in an area extending 10 nm in depth from the outermost surface of the alloy plating layer.

If the Cr concentration in the area mentioned above is more than 35%, a large amount of Cr may be exposed on the outermost surface of the alloy plating layer. The Cr may absorb oxygen and nitrogen in the air under high temperature, and may embrittle. Consequently, the heat resistance of the plated steel sheet may be impaired. If the Fe concentration in the area mentioned above is more than 0.5%, a large amount of Fe may be exposed on the outermost surface of the alloy plating layer. The Fe is oxidized by oxygen in the air. Consequently, the corrosion resistance and the heat resistance of the plated steel sheet may be reduced. From the viewpoints of corrosion resistance and heat resistance, for the concentration of each plating component in the area mentioned above, it is preferable that the concentration of Cr be 0 to 15%, Ni 85 to 100%, and Fe 0.1%, and it is more preferable that the concentration of Cr be 0 to 4%, Ni 96 to 100%, and Fe 0%.

Ni or Ni—Cr alloy is excellent in stability in a high-temperature atmosphere; however, in the case where plating of only Ni or Ni—Cr alloy is performed on a steel sheet, the plating layer peels off together with scales produced at the interface between the plating layer and the steel sheet in a high-temperature oxidizing atmosphere. Thus, in the present embodiment, a large amount of Cr is incorporated near the interface between the alloy plating layer and the steel sheet. Thereby, the adhesiveness between the alloy plating layer and the steel sheet in a high-temperature environment is enhanced. From this point of view, it is preferable that a Cr—Fe alloy layer be formed with a thickness of 300 nm or more near the interface between the alloy plating layer and the steel sheet.

Figure 1:
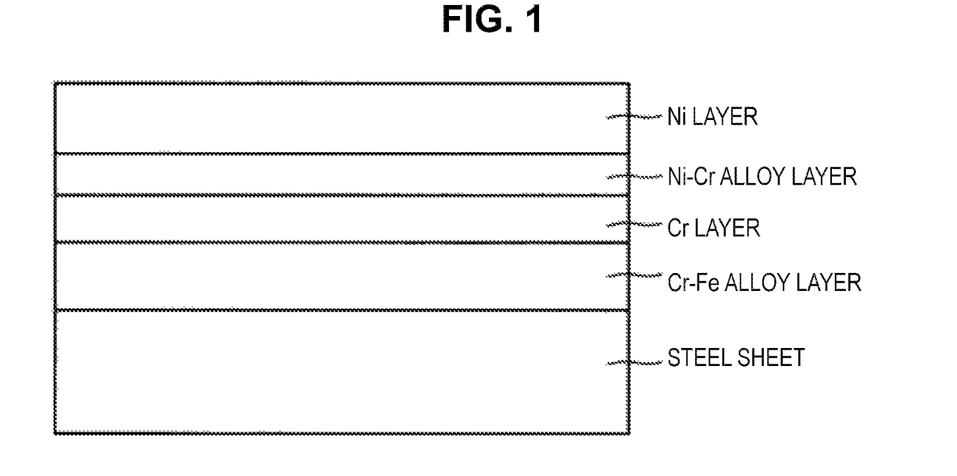
FIG. 1 is an example of a schematic cross-sectional view of a covering film of a Ni—Cr-plated steel sheet according to the present embodiment.

The following is combinations of plating configuration, in descending order of preferability in heat resistance performance:

1. a Ni layer, a Ni—Cr alloy layer, a Cr layer, and a Cr—Fe alloy layer in this order from the outermost surface of the alloy plating layer (see FIG. 1);
2. a Ni layer, a Ni—Cr alloy layer, and a Cr—Fe alloy layer in this order from the outermost surface of the alloy plating layer;
3. a Ni layer, a Ni—Cr alloy layer, a Ni—Cr—Fe alloy layer, and a Cr—Fe alloy layer in this order from the outermost surface of the alloy plating layer;
4. a Ni layer, a Ni—Cr alloy layer, and a Ni—Cr—Fe alloy layer in this order from the outermost surface of the alloy plating layer;
5. a Ni—Cr alloy layer, a Cr layer, and a Cr—Fe alloy layer in this order from the outermost surface of the alloy plating layer;
6. a Ni—Cr alloy layer, a Ni—Cr—Fe alloy layer, and a Cr—Fe alloy layer in this order from the outermost surface of the alloy plating layer;
7. a Ni—Cr alloy layer and a Cr—Fe alloy layer in this order from the outermost surface of the alloy plating layer; and
8. a Ni—Cr alloy layer and a Ni—Cr—Fe alloy layer in this order from the outermost surface of the alloy plating layer.

A Ni—Cr alloy layer is included in all of the configurations. That is, in the present embodiment, the presence of a Ni—Cr alloy layer is important, and desired heat resistance and the like are achieved by the Ni—Cr alloy layer.

Figure 2:
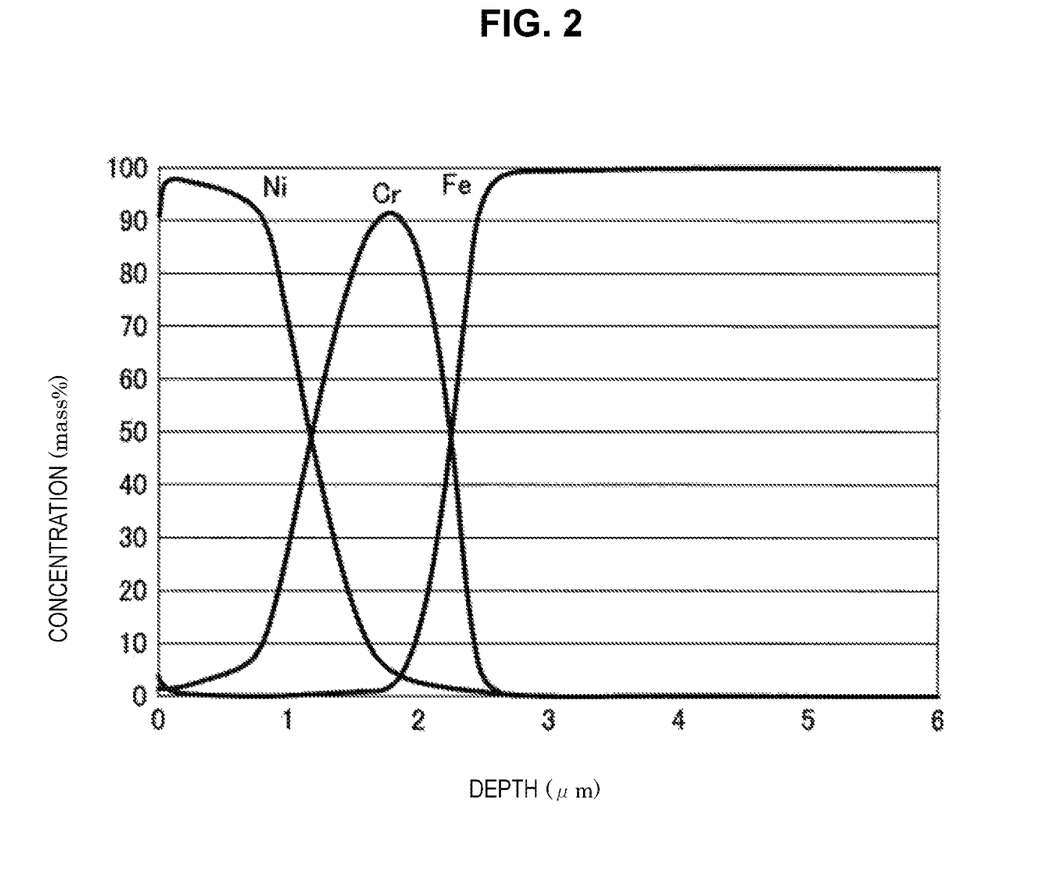
FIG. 2 is an example of an analysis by glow discharge optical emission spectrometry of a plated steel sheet according to the present embodiment.

The concentration of each component in the alloy plating layer can be measured by glow discharge spectroscopy (GDS). The concentration distribution in the sheet thickness direction of each component can be identified by the glow discharge spectroscopy. An example of the measurement data is shown in FIG. 2. The horizontal axis represents the distance (depth) (μm) from the outermost surface of the alloy plating layer, and the vertical axis represents the concentration of each component (mass %). The plated steel sheet showing the result of FIG. 2 was produced by the following process. That is, Cr plating was performed with an deposited amount of 7.2 g/m$^2$ on a cold rolled steel sheet. Subsequently, Ni plating was performed with an deposited amount of 10 g/m$^2$ on the Cr plating layer. Subsequently, the cold rolled steel sheet on which the Cr plating layer and the Ni plating layer were formed was introduced into an annealing furnace. Subsequently, the internal temperature of the annealing furnace was increased up to 820° C. in 82 seconds, and the cold rolled steel sheet was held for 20 seconds. By this process, a plated steel sheet was obtained. The measurement conditions are as shown in Table 1. Also in Examples described later, the concentration of each component was measured using similar measurement conditions. The concentration in the entire area in the thickness direction can be calculated on the basis of the integrated value obtained by integrating the measured data in the depth direction.

TABLE 1

| | |
|---|---|
| Discharge condition | 35 W (constant power mode) |
| Ar pressure | 600 Pa |
| Discharge mode | Normal sputtering |
| Discharge range | Diameter of 4 mm |
| Measurement elements | B, C, Cr, Cu, Fe, Mn, N, Ni, O, and Sn, total of 10 elements |
| Measurement time | 100 sec |
| Reading interval time | 0.02 sec/point |
| Qualitative/quantitative measurement | Quantitative measurement |

Further, the present inventors conducted extensive studies on the composition of the alloy plating layer necessary to enhance the long-term heat resistance of the plated steel sheet. As described above, in order to enhance the heat resistance of the alloy plating layer, it is necessary to form a Ni—Cr layer in the alloy plating layer. To what degree the Cr—Ni layer is formed in the alloy plating layer depends on the deposited amount of Cr plating ($g/m^2$), the deposited amount of Ni plating ($g/m^2$), and the ratio of the deposited amount of Cr/Ni plating in the alloy plating layer. Thus, the present inventors have found that the deposited amount of Cr plating ($g/m^2$), the deposited amount of Ni plating ($g/m^2$), and the ratio of the deposited amount of Cr/Ni plating in the alloy plating layer are important. Here, the deposited amount of Cr plating represents the mass of Cr contained in a unit area and the entire area in the thickness direction of the alloy plating layer, and the deposited amount of Ni plating represents the mass of Ni contained in the unit area and the entire area in the thickness direction of the alloy plating layer. The ratio of the deposited amount of Cr/Ni plating is the value obtained by dividing the deposited amount of Cr plating by the deposited amount of Ni plating. The deposited amount of Cr plating and the deposited amount of Ni plating can be calculated on the basis of the Cr concentration and the Ni concentration in the alloy plating layer.

Specifically, it is preferable that the deposited amount of Cr plating in the alloy plating layer be 3.5 to 28.8 $g/m^2$, the deposited amount of Ni plating in the alloy plating layer be 3.0 to 26.7 $g/m^2$, and the ratio of the deposited amount of Cr/Ni plating in the alloy plating layer be 0.9 to 5.0. In this case, long-term heat resistance is further improved.

In the case where the ratio of the deposited amount of Cr/Ni plating is more than 5.0, when the plated steel sheet is exposed under high temperature for a long time, Cr absorbs nitrogen and oxygen, and embrittles. In the case where the ratio of the deposited amount of Cr/Ni plating is less than 0.9, a large amount of Ni forms an alloy with Fe. The Ni—Fe alloy is, upon being oxidized, likely to peel off from the steel sheet. Consequently, the heat resistance of the alloy plating layer is reduced.

Here, the deposited amount of Cr plating is preferably more than 3.5 $g/m^2$. The deposited amount of Ni plating is more preferably 3.0 to 15.0 $g/m^2$, and still more preferably 5.0 to 10.0 $g/m^2$. The ratio of the deposited amount of Cr/Ni plating is more preferably 1.2 to 3.0. In this case, long-term heat resistance is further improved.

It is more preferable that the deposited amount of Cr plating ($g/m^2$), the deposited amount of Ni plating ($g/m^2$), and the ratio of the deposited amount of Cr/Ni plating satisfy conditions (a) and (b) below. In this case, long-term heat resistance is further improved.

(a) The deposited amount of Cr plating is more than 3.5 $g/m^2$ and 28.8 $g/m^2$ or less.

(b) At least one of the condition that the deposited amount of Ni plating be 5.0 to 10.0 $g/m^2$ and the condition that the ratio of the deposited amount of Cr/Ni plating be 1.2 to 3.0 is satisfied.

Here, in regard to condition (b), it is more preferable that both of the condition that the deposited amount of Ni plating be 5.0 to 10.0 $g/m^2$ and the condition that the ratio of the deposited amount of Cr/Ni plating be 1.2 to 3.0 be satisfied.

<Method for Producing Plated Steel Sheet>

Next, a method for producing a plated steel sheet according to the present embodiment is described. The method for producing a plated steel sheet is roughly as follows. First, Cr plating is performed with an deposited amount of 1.5 to 28.8 $g/m^2$ on one surface or both surfaces of a steel sheet, and thereby a Cr plating layer is formed on the one surface or both surfaces of the steel sheet. Subsequently, Ni plating is performed with an deposited amount of 3 to 26.7 $g/m^2$ on the Cr plating layer, and thereby a Ni plating layer is formed on the Cr plating layer. Subsequently, the steel sheet on which the Cr plating layer and the Ni plating layer are formed is held at a temperature of 600° C. to 900° C. for a time more than 0 seconds and 60 seconds or less in a non-oxidizing atmosphere or a reducing atmosphere. By this process, a plated steel sheet according to the present embodiment is produced. Details of the production method are as follows.

First, a steel sheet is subjected to degreasing and pickling treatment. Subsequently, Cr plating is performed with an deposited amount of 1.5 to 28.8 $g/m^2$ on one surface or both surfaces of the steel sheet. Thereby, a Cr plating layer is formed on the steel sheet. The method of Cr plating is not particularly limited, and may be the electrolysis method, for example. In the case where Cr plating is performed by the electrolysis method, production conditions such as plating bath conditions are not particularly limited.

In the case where the deposited amount of Cr plating is less than 1.5 $g/m^2$, a Cr—Fe-containing alloy layer effective in the adhesiveness of the alloy plating layer in a high-temperature environment cannot be sufficiently formed. Thus, it is difficult to form a Cr—Fe-containing alloy layer with a total thickness of 300 nm or more. In the case where the deposited amount of Cr plating is more than 28.8 $g/m^2$, the cost needed for Cr plating treatment is increased due to the increase in the time of plating treatment and the like. Thus, this is not economical. In addition, processability such as bendability is reduced. The deposited amount of Cr plating is preferably 2.0 to 15.0 $g/m^2$, and more preferably 3.5 to 6 $g/m^2$. The deposited amount of Cr plating is preferably more than 3.5 $g/m^2$ from the viewpoint of improving the long-term heat resistance of the plated steel sheet.

Subsequently, Ni plating is performed on the Cr plating layer, and thereby a Ni plating layer is formed on the Cr plating layer. The method of Ni plating is not particularly questioned; in the case where a Ni plating layer is formed on the Cr plating layer, a Ni strike bath with a low pH or the like may be used. The conditions of the Ni strike bath are not particularly limited.

In the case where the deposited amount of Ni plating is less than 3.0 $g/m^2$, the underlying Cr cannot be sufficiently covered with a Ni plating layer. Accordingly, the Ni—Cr alloy layer after heat treatment is thin and non-uniform. In addition, it is difficult to form an area where Ni/Cr>1 with a thickness of 300 nm or more. Consequently, an alloy plating layer having heat resistance is not obtained. Furthermore, in this case, even if firing is performed, the purity of the Cr plating layer remains high. Furthermore, the Cr plating layer is insufficiently covered with a Ni plating layer. Consequently, the high-purity Cr plating layer is not only likely to embrittle under room temperature, but also absorbs oxygen and nitrogen under high temperature and is likely to embrittle even more. Also from this point, heat resistance is reduced.

On the other hand, in the case where the deposited amount of Ni plating is more than 26.7 g/m², the cost needed for Ni plating treatment is increased due to the increase in the expense of Ni plating treatment, the increase in the time of plating treatment, and the like. Thus, this is not economical. In addition, the adhesiveness between the Ni plating layer and the Cr plating layer is reduced. Hence, it is likely that part of the alloy plating layer will peel off at the interface between these layers (specifically, the interface between the layer in which Ni>Cr and the layer in which Ni<Cr) during bending or the like. From the above points of view, the deposited amount of Ni plating is preferably 3.0 to 15.0 g/m², and more preferably 5.0 to 10.0 g/m².

The deposited amount of Cr plating and the deposited amount of Ni are adjusted so that the Cr concentration in the alloy plating layer is 5 to 91%. After that, the heat treatment described below is performed; thereby, an alloy plating layer satisfying the requirements described above is formed on the steel sheet.

Subsequently, the steel sheet on which the Cr plating layer and the Ni plating layer are formed is heat-treated. Specifically, the steel sheet is held at a temperature of 600° C. to 900° C. for a time more than 0 seconds and 60 seconds or less in a non-oxidizing atmosphere or a reducing atmosphere. In order to prevent the oxidation of the end surface of the Cr plating layer or the Cr plating layer exposed from a pinhole in the Ni plating layer, the heat treatment of the steel sheet on which the Cr plating layer and the Ni plating layer are formed is thus performed in a non-oxidizing atmosphere or a reducing atmosphere. Here, examples of the non-oxidizing atmosphere or the reducing atmosphere include an atmosphere of $N_2$ gas, Ar gas, $H_2$ gas, or a mixed gas of these. The heating method is not particularly limited, and any of furnace heating, energization heating, induction heating, and the like may be used. Components in the steel sheet, the Ni plating layer, and the Cr plating layer are diffused by the heat treatment. For example, Cr in the Cr plating layer diffuses into the Ni plating layer, and Ni in the Ni plating layer diffuses into the Cr plating layer. Further, Fe in the steel sheet diffuses into the Cr plating layer and the Ni plating layer. In the case where heat treatment is not performed, not only is it impossible to obtain the alloy plating layer described above, but also the adhesiveness between the Ni plating layer and the Cr plating layer is insufficient. In particular, in the case where a Ni plating layer is formed thick using a Watts bath or the like, the adhesiveness is particularly insufficient.

The rate of temperature increase is not particularly limited, and may be substantially equal to that of heating treatment performed in the production line of a conventional plated steel sheet. However, if a time longer than 120 seconds elapses until the target peak temperature is reached, the time of thermal diffusion is long and this is not economical, and furthermore Fe may diffuse up to the surface. Thus, the time required until the target peak temperature is reached is preferably 120 seconds or less.

The rate of diffusion of each component is proportional to the square root of the diffusion coefficient. For Fe, the diffusion coefficient of γ-Fe, the temperature of which is higher, is smaller than the diffusion coefficient of α-Fe, the temperature of which is lower. When γ-Fe is diffused, a deformation of the steel sheet is likely to occur due to a phase transformation of Fe caused by cooling. In particular, in the case where the steel sheet is thin, a deformation of the steel sheet appears significantly. On the other hand, α-Fe has a tendency to diffuse rapidly at the grain boundary. Hence, it is preferable that the heat treatment temperature be 900° C. or less, that is, Fe be diffused in the state of α-Fe. On the other hand, in the case where the heat treatment temperature is less than 600° C., even α-Fe has a low rate of diffusion. Hence, a long time is needed for diffusion, and productivity is poor. Thus, the heat treatment temperature, that is, the holding temperature is 600 to 900° C.

The holding time after temperature increase is set to more than 0 seconds and 60 seconds or less. It is preferably set to 1 to 30 seconds. In the case where the holding time is longer than 60 seconds, there is a possibility that the concentration ratio of Ni to Cr of the outermost surface of the alloy plating layer will be Ni/Cr<1. In particular, this possibility increases as the deposited amount of Ni plating decreases. Furthermore, the thickness of the Cr—Fe layer is made larger than 2000 nm, and Fe diffuses up to the outermost surface of the alloy plating layer; consequently, heat resistance is reduced.

The holding temperature and the holding time are adjusted in the ranges mentioned above in accordance with the deposited amount of Cr plating and the deposited amount of Ni plating. That is, the holding temperature and the holding time are adjusted so that an alloy plating layer satisfying the requirements described above is formed on the steel sheet.

After the heat treatment, the plated steel sheet is cooled. Here, the cooling rate is not particularly limited, and may be substantially equal to that of cooling treatment performed in the production line of a conventional plated steel sheet.

Further, the present inventors conducted extensive studies on the heat treatment conditions needed to enhance the heat resistance of the plated steel sheet (in particular, long-term heat resistance). If Ni is excessively thermally diffused in the alloy plating layer during heat treatment, a Ni—Fe layer peels off from the steel sheet in a high-temperature oxidizing atmosphere. To what degree Ni diffuses in the alloy plating layer depends not only on the holding temperature and the holding time but also on the deposited amount of Cr plating. Thus, the present inventors have found that there is a strong correlation between the deposited amount of Cr plating, and the holding temperature and the holding time. Specific heat treatment conditions are as follows. In the case where the heat treatment conditions satisfy the following conditions, also the bendability of the plated steel sheet is improved.

In the case where the deposited amount of Cr plating is 1.5 to 3.5 g/m², it is preferable that the holding temperature be 600° C., and the holding time be as short as possible (for example, less than 1 second).

In the case where the deposited amount of Cr plating is more than 3.5 g/m² and 6.0 g/m² or less, it is preferable that the holding temperature be 600 to 800° C., and the upper limit value of the holding time be 5 or less times as large as the reference time found by Mathematical Formulae (1) and (2) below. The lower limit value of the holding time is preferably 10 seconds or more.

$$T = kT_0 \quad (1)$$

$$T_0 = -0.15*(H-600)+50 \quad (2)$$

Here, in Mathematical Formulae (1) and (2), T represents a reference temperature, and $T_0$ represents a reference time when the deposited amount of Cr plating is 6 g/m². k represents a correction factor, and is a value obtained by dividing the deposited amount of Cr plating (g/m²) of the Cr plating layer of the object to be fired by 6 g/m² (that is, the maximum deposited amount). H represents the holding temperature.

In the case where the deposited amount of Cr plating is more than 6.0 g/m² and 15.0 g/m² or less, it is preferable that the holding temperature be 650 to 800° C., and the upper limit value of the holding time be 5 or less times as large as the reference time found by Mathematical Formulae (3) and (4) below. The lower limit value of the holding time is preferably 10 seconds or more.

$$T=kT_0 \quad (3)$$

$$T_0=-0.13*(H-600)+50 \quad (4)$$

Here, in Mathematical Formulae (3) and (4), T represents a reference temperature, and $T_0$ represents a reference time when the deposited amount of Cr plating is 15.0 g/m². k represents a correction factor, and is a value obtained by dividing the deposited amount of Cr plating (g/m²) of the Cr plating layer of the object to be fired by 15.0 g/m² (that is, the maximum deposited amount). H represents the holding temperature.

In the case where the deposited amount of Cr plating is more than 15.0 g/m² and 28.8 g/m² or less, it is preferable that the holding temperature be 700 to 900° C., and the upper limit value of the holding time be 5 or less times as large as the reference time found by Mathematical Formulae (5) and (6) below. The lower limit value of the holding time is preferably 10 seconds or more.

$$T=kT_0 \quad (5)$$

$$T_0=-0.12*(H-600)+60 \quad (6)$$

Here, in Mathematical Formulae (5) and (6), T represents a reference temperature, and $T_0$ represents a reference time when the deposited amount of Cr plating is 28.8 g/m². k represents a correction factor, and is a value obtained by dividing the deposited amount of Cr plating (g/m²) of the Cr plating layer of the object to be fired by 28.8 g/m² (that is, the maximum deposited amount). H represents the holding temperature.

In the case where the heat treatment conditions satisfy the requirements described above, at least short-term heat resistance is improved. In the case where these heat treatment conditions are satisfied and at the same time the deposited amount of Cr plating, the deposited amount of Ni plating, and the ratio of the deposited amount of Cr/Ni plating satisfy the requirements described above, not only short-term heat resistance but also long-term heat resistance is improved.

Thus, the plated steel sheet according to the present embodiment is excellent not only in heat resistance but also in corrosion resistance and adhesiveness. Furthermore, in the method for producing a plated steel sheet, since the holding time is short, the plated steel sheet according to the present embodiment can be produced with high productivity.

EXAMPLES

Experimental Example 1

In Experimental Example 1, the following experiment was conducted in order to verify that the plated steel sheet according to the present embodiment has high heat resistance. First, a cold rolled steel sheet (thickness: 0.8 mm) was prepared as a steel sheet. Subsequently, the cold rolled steel sheet was subjected to alkaline degreasing and sulfuric acid pickling, and thereby the water wettability of the cold rolled steel sheet was sufficiently ensured. Subsequently, Cr plating was performed on the cold rolled steel sheet, and thereby a Cr plating layer was formed on the cold rolled steel sheet. The Cr plating was performed by the electrolysis method. The plating conditions are shown in (A) below. Further, the deposited amount of Cr plating is shown in Table 2. Subsequently, Ni plating was performed on the Cr plating layer, and thereby a Ni plating layer was formed on the Cr plating layer. Also the Ni plating was performed by the electrolysis method, and a strike bath was used as the plating bath. The plating conditions are shown in (B) below. Further, the deposited amount of Ni plating is shown in Table 2.

(A) Electrolytic Cr plating
(1) Plating bath components: Sargent bath
Chromic acid: 250 g/l
Sulfuric acid: 3 g/l
(2) Electrolysis conditions
Temperature: 50° C.
Current density: 30 A/dm²
(B) Electrolytic Ni plating
 Strike bath
(1) Plating bath components
Nickel chloride: 240 g/l
Hydrochloric acid: 125 ml/l
(2) Electrolysis conditions
pH: 1.0 to 1.5
Temperature: room temperature (25° C.)
Current density: 4 A/dm²
 Watts bath
(1) Plating bath components
Nickel sulfate: 240 g/l
Nickel chloride: 45 g/l
Boric acid: 30 g/l
(2) Electrolysis conditions
pH: 3.5 to 4.5
Temperature: 50° C.
Current density: 5 A/dm²

Subsequently, the cold rolled steel sheet on which the Cr plating layer and the Ni plating layer were formed was introduced into an annealing furnace. The interior of the annealing furnace was set to a 2 volume % $H_2$-98 volume % $N_2$ atmosphere. Next, the internal temperature of the annealing furnace was increased at 10° C./sec up to the holding temperature shown in Table 2. Subsequently, the holding temperature was kept during the holding time shown in Table 2. Subsequently, the plated steel sheet was rapidly cooled up to 200° C. using $N_2$ gas. The cooling rate at this time was set to 70° C./sec. After that, the plated steel sheet was allowed to cool. By this process, a sample of a plated steel sheet was produced. In this Experimental Example 1, the deposited amount of Cr plating, the deposited amount of Ni plating, and the heat treatment conditions were variously changed, and thereby a plurality of kinds of samples (levels) were produced. The compositions of the samples are collectively shown in Table 2. The concentration of each component in the alloy plating layer was measured by glow discharge spectroscopy (GDS). The measurement conditions are shown in Table 1. In Table 2, a preferred range of each component is written as well. Numerical values that are out of the preferred ranges are underlined. "Plating layer structure" shown in Table 2 shows the class of the layer structure of the alloy plating layer. The corresponding relationship between each class and the layer structure is shown in Table 3.

<Evaluation of Heat Resistance>

To evaluate the heat resistance of the produced sample (plated steel sheet), the sample was exposed in the air atmosphere at 600° C. for 120 hours. After that, the sample was allowed to cool in the air, and the oxidation state of the surface was investigated.

After the test, in the case where red rust derived from Fe had occurred on the sample or the plating had peeled off during the allowing to cool in the air, the heat resistance was evaluated as bad (B); in the case where the surface of the sample had been oxidized and had much coarseness, the heat resistance was evaluated as good (G); and in the case where there was little coarseness, the heat resistance was evaluated as very good (VG). For the sample of VG, a heat resistance test was further performed. At the stage of a total of 250 hours, in the case where there was little coarseness, the heat resistance was evaluated as excellent (E); and in the case where there was much coarseness, the evaluation was kept VG as it was. The coarseness was evaluated by the following method. That is, the surfaces of the alloy plating layer before and after the test were compared by visual observation, and thereby whether concavities and convexities (that is, coarseness) were formed on the surface of the alloy plating layer after the test was assessed. In the case where the size of the area where coarseness was formed was less than 50% relative to the entire surface of the alloy plating layer, it was assessed that there was little coarseness; and in the case where the size of the area where coarseness was formed was 50% or more relative to the entire surface of the alloy plating layer, it was assessed that there was much coarseness. Even in the case where there is much coarseness, there is no practical problem. The results are shown in Table 2.

<Evaluation of Adhesiveness (Bending Test)>

To evaluate the processability of the produced sample, (j) the bending test method out of the plating adhesiveness test method of JIS H 8504 was performed. However, the bending-back described in JIS was not performed; and after that, in the bent state as it was, further (l) the tape test method out of (g) the peeling test method was performed using a JIS Z 1522 adhesive tape; thus, the plating adhesiveness of the sample was evaluated.

In the case where the plating was peeled off at the stage when the sample was bent, the adhesiveness was evaluated as bad (B); in the case where the procedure of sticking a tape to and then stripping it from the bent portion of the sample causes part of the plating to be deposited to the tape, the adhesiveness was evaluated as good (G); and in the case where the plating was not peeled off by the tape, the adhesiveness was evaluated as VG. The results are shown in Table 2.

TABLE 2

| No. | Deposited amount of alloy plating g/m² 4.5-55.5 | Deposited amount of Cr plating g/m² 1.5-28.8 | Deposited amount of Ni plating g/m² 3.0-26.7 | Heat treatment conditions Holding temperature ° C. 600-900 | Heat treatment conditions Holding time sec 0<, ≤60 | Components of alloy plating layer in area where Cr/Fe > 1 Cr mass % 5-91 | Components of alloy plating layer in area where Cr/Fe > 1 Fe mass % ≤10 | Components of alloy plating layer in area where Cr/Fe > 1 Ni + impurities mass % Balance | Thickness of surface Ni > Cr area nm ≥300 |
|---|---|---|---|---|---|---|---|---|---|
| 1 | 6.6 | 3.6 | 3 | 600 | 20 | 54 | 2 | 44 | 390 |
| 2 | 18.6 | 3.6 | 15 | 600 | 20 | 18 | 3 | 79 | 1700 |
| 3 | 10 | 5 | 5 | 700 | 10 | 49 | 3 | 48 | 570 |
| 4 | 8 | 5 | 3 | 700 | 10 | 62 | 2 | 36 | 370 |
| 5 | 13.5 | 5 | 8.5 | 800 | 20 | 36 | 3 | 61 | 960 |
| 6 | 15 | 5 | 10 | 800 | 20 | 33 | 3 | 64 | 1150 |
| 7 | 10.5 | 7.5 | 3 | 700 | 10 | 70 | 3 | 27 | 480 |
| 8 | 12.5 | 7.5 | 5 | 800 | 20 | 57 | 4 | 39 | 580 |
| 9 | 16 | 7.5 | 8.5 | 800 | 20 | 46 | 3 | 51 | 960 |
| 10 | 17.5 | 7.5 | 10 | 800 | 20 | 37 | 5 | 58 | 1170 |
| 11 | 22.5 | 7.5 | 15 | 800 | 60 | 29 | 7 | 64 | 1700 |
| 12 | 34.2 | 7.5 | 26.7 | 800 | 60 | 19 | 6 | 75 | 2850 |
| 13 | 13 | 10 | 3 | 800 | 10 | 75 | 3 | 22 | 490 |
| 14 | 25 | 10 | 15 | 800 | 60 | 39 | 8 | 53 | 1650 |
| 15 | 36.7 | 10 | 26.7 | 800 | 60 | 23 | 8 | 69 | 2650 |
| 16 | 55.5 | 28.8 | 26.7 | 900 | 30 | 50 | 10 | 41 | 2730 |
| 17 | 17.5 | 7.5 | 10 | 800 | 15 | 42 | 3 | 55 | 1140 |
| 18 | 12.5 | 7.5 | 5 | 600 | <1 | 60 | 0.5 | 39 | 570 |
| 19 | 28 | 1.5 | 26.5 | 600 | 20 | 5 | 2 | 93 | 2850 |
| 20 | 32 | 28.5 | 3.5 | 800 | <1 | 91 | 2 | 7 | 520 |
| 21 | 4.5 | 1.5 | 3 | 600 | 20 | 30 | 5 | 65 | 500 |
| 22 | 4.5 | 1.5 | 3 | 800 | 10 | 29 | 7 | 64 | 530 |
| 23 | 20 | 2.16 | 17.8 | 800 | 600 | 7 | 13 | 80 | 3150 |
| 24 | 20 | 2.16 | 17.8 | 800 | 250 | 26 | 3 | 71 | 1430 |
| 25 | 5 | 3.6 | 1 | 800 | 30 | 78 | 2 | 20 | 200 |
| 26 | 38 | 2 | 35.6 | 800 | 600 | 22 | 16 | 62 | 4500 |
| 27 | 2 | 0.15 | 1.85 | 800 | 30 | 2 | 2 | 96 | — |

| No. | Fe concentration of outermost surface mass % ≤0.5 | Components in area of 10 nm from plating layer surface Cr mass % 0-35 | Components in area of 10 nm from plating layer surface Fe mass % ≤0.5 | Components in area of 10 nm from plating layer surface Ni + impurities mass % 65-100 | Plating layer structure | Total thickness of Cr—Fe— containing alloy layer nm 500-2000 | Performance evaluation 600° C., 250 h Heat resistance test | Performance evaluation Bending test Tape peeling | Notes |
|---|---|---|---|---|---|---|---|---|---|
| 1 | ≤0.1 | 32 | ≤0.1 | 68 | No. 7 | 600 | VG | VG | Example |
| 2 | ≤0.1 | 0 | ≤0.1 | 100 | No. 2 | 800 | E | VG | |
| 3 | ≤0.1 | 22 | ≤0.1 | 78 | No. 6 | 780 | VG | VG | |

TABLE 2-continued

| | | | | | | | | | |
|---|---|---|---|---|---|---|---|---|---|
| 4 | ≤0.1 | 35 | ≤0.1 | 65 | No. 7 | 620 | VG | VG | |
| 5 | ≤0.1 | 8 | ≤0.1 | 92 | No. 5 | 1200 | VG | VG | |
| 6 | ≤0.1 | 0 | ≤0.1 | 100 | No. 1 | 1270 | E | VG | |
| 7 | ≤0.1 | 36 | ≤0.1 | 64 | No. 7 | 700 | VG | VG | |
| 8 | ≤0.1 | 15 | ≤0.1 | 75 | No. 6 | 1220 | VG | VG | |
| 9 | ≤0.1 | 14 | ≤0.1 | 86 | No. 5 | 1130 | VG | VG | |
| 10 | ≤0.1 | 0 | ≤0.1 | 100 | No. 1 | 1260 | E | VG | |
| 11 | ≤0.1 | 0 | ≤0.1 | 100 | No. 1 | 1740 | E | VG | |
| 12 | ≤0.1 | 0 | ≤0.1 | 100 | No. 1 | 1780 | E | G | |
| 13 | ≤0.1 | 37 | ≤0.1 | 63 | No. 8 | 890 | VG | VG | |
| 14 | ≤0.1 | 0 | ≤0.1 | 100 | No. 4 | 1820 | E | VG | |
| 15 | ≤0.1 | 0 | ≤0.1 | 100 | No. 4 | 1850 | E | G | |
| 16 | ≤0.1 | 0 | ≤0.1 | 100 | No. 3 | 1930 | VG | G | |
| 17 | ≤0.1 | 0 | ≤0.1 | 100 | No. 3 | 900 | E | VG | |
| 18 | ≤0.1 | 0 | ≤0.1 | 100 | No. 3 | 100 | E | G | |
| 19 | ≤0.1 | 0 | ≤0.1 | 100 | No. 1 | 800 | E | G | |
| 20 | ≤0.1 | 11 | ≤0.1 | 89 | No. 7 | 680 | VG | G | |
| 21 | ≤0.1 | 22 | ≤0.1 | 78 | No. 5 | 650 | VG | VG | |
| 22 | 0.3 | 21 | 0.3 | 79 | No. 5 | 680 | G | VG | |
| 23 | ≤0.1 | 14 | ≤0.1 | 86 | No. 5 | 5600 | B | VG | Compar- |
| 24 | ≤0.1 | 0 | ≤0.1 | 100 | No. 1 | 2100 | B | VG | ative |
| 25 | 0.5 | 46 | 0.5 | 54 | No. 5 | 700 | B | B | Example |
| 26 | 1 | 2 | 1 | 97 | No. 9 | 5200 | B | VG | |
| 27 | 0.3 | 0 | 0.3 | 100 | No. 10 | 350 | B | B | |

TABLE 3

| Plating layer structure No. | | Notes |
|---|---|---|
| 1 | Ni layer, Ni—Cr alloy layer, Ni—Cr—Fe alloy layer, and Cr—Fe alloy layer in this order from outermost surface of alloy plating layer | Example |
| 2 | Ni layer, Ni—Cr alloy layer, and Ni—Cr—Fe alloy layer in this order from outermost surface of alloy plating layer | |
| 3 | Ni layer, Ni—Cr alloy layer, Cr layer, and Cr—Fe alloy layer in this order from outermost surface of alloy plating layer | |
| 4 | Ni layer, Ni—Cr alloy layer, and Cr—Fe alloy layer in this order from outermost surface of alloy plating layer | |
| 5 | Ni—Cr alloy layer, Ni—Cr—Fe alloy layer, and Cr—Fe layer in this order from outermost surface of alloy plating layer | |
| 6 | Ni—Cr alloy layer and Ni—Cr—Fe alloy layer in this order from outermost surface of alloy plating layer | |
| 7 | Ni—Cr alloy layer and Cr—Fe layer in this order from outmost surface of alloy plating layer | |
| 8 | Ni—Cr alloy layer, Cr layer, and Cr—Fe layer in this order from outermost surface of alloy plating layer | |
| 9 | Ni layer, Ni—Cr—Fe alloy layer, and Ni—Fe alloy layer in this order from outermost surface of alloy plating layer | Comparative Example |
| 10 | Ni—Cr—Fe alloy layer and Ni—Fe alloy layer in this order from outermost surface of alloy plating layer | |

Experimental Example 2

In Experimental Example 2, the influence on heat resistance, in particular long-term heat resistance, by the deposited amount of Cr plating, the deposited amount of Ni plating, the ratio of the deposited amount of Cr/Ni plating, and the heat treatment conditions was investigated further in detail. First, a plurality of kinds of samples (plated steel sheets) between which the deposited amount of Cr plating, the deposited amount of Ni plating, the ratio of the deposited amount of Cr/Ni plating, and the heat treatment conditions were different were produced by a similar method to Example 1. The deposited amount of plating and the heat treatment conditions of each sample are shown in Table 4. In Table 4, preferred ranges of the deposited amount of plating and the like are written as well. In the sample corresponding to Example, it has been verified that the parameters shown in Table 2 satisfy the requirements of the present embodiment.

<Evaluation of Heat Resistance>

To evaluate the heat resistance of the produced sample, the sample was exposed in the air atmosphere at 600° C. for 120 hours. Subsequently, the sample was allowed to cool in the air, and the oxidation state of the surface was investigated (the heat resistance test: short). The sample evaluated as good (G) or better by the following evaluation criterion was further exposed for 280 hours (that is, a total of 400 hours) (the heat resistance test: long). Subsequently, the sample was allowed to cool in the air, and the oxidation state of the surface was investigated.

The oxidation state of the surface in each heat resistance test was evaluated by the following criterion. In the case where the area where red rust derived from Fe had occurred was 80% or more relative to the entire surface of the alloy plating layer or the plating had peeled off during the allowing to cool in the air, the heat resistance was evaluated as bad (B). In the case where the area where red rust had occurred was 30% or more and less than 80% relative to the entire surface of the alloy plating layer (in the case where the occurrence of red rust was at a level with no practical problem), the heat resistance was evaluated as good (G). In the case where the area where red rust had occurred was less than 30% relative to the entire surface of the alloy plating layer or there was much coarseness, the heat resistance was evaluated as very good (G). In the case where the area where red rust had occurred was substantially equal to that of VG and the surface had little coarseness (or no coarseness), the heat resistance was evaluated as excellent (E). The coarseness was evaluated in a similar manner to Experimental Example 1. The evaluation results are shown in Table 4.

TABLE 4

| No. | Deposited amount of alloy plating g/m² 4.5-55.5 | Cr/Ni 0.9-5.0 1.2-3.0 | Deposited amount of Cr plating g/m² 3.5-28.8 3.5<, ≤28.8 | Deposited amount of Ni plating g/m² 3.0-26.7 3.0-15.0 5.0-10.0 | Heat treatment conditions Holding temperature °C. | Holding time sec | $T_0$ sec | $T_1$ sec | Heat resistance test: short | Heat resistance test: long | Notes |
|---|---|---|---|---|---|---|---|---|---|---|---|
| 1 | 4.7 | 3 | 3.5 | 1.2 | 600 | <1 | 0 | 0 | B | | Comparative Example |
| 2 | 6.4 | 1.2 | 3.5 | 2.9 | 600 | <1 | 0 | 0 | B | | |
| 3 | 4.2 | 5 | 3.5 | 0.7 | 600 | <1 | 0 | 0 | B | | |
| 4 | 7.4 | 0.9 | 3.5 | 3.9 | 600 | <1 | 0 | 0 | E | G | Example |
| 5 | 8 | 3 | 6 | 2 | 600 | <1 | 0 | 0 | B | B | Comparative Example |
| 6 | 9 | 2 | 6 | 3 | 800 | 20 | 20 | 20 | E | E | Example |
| 7 | 11 | 1.2 | 6 | 5 | 800 | 20 | 20 | 20 | E | E | |
| 8 | 7.2 | 5 | 6 | 1.2 | 800 | 20 | 20 | 20 | B | | Comparative Example |
| 9 | 12.7 | 0.9 | 6 | 6.7 | 800 | 20 | 20 | 20 | E | E | Example |
| 10 | 20 | 3 | 15 | 5 | 800 | 20 | 24 | 24 | E | E | |
| 11 | 27.5 | 1.2 | 15 | 12.5 | 800 | 20 | 24 | 24 | E | E | |
| 12 | 18 | 5 | 15 | 3 | 800 | 20 | 24 | 24 | E | VG | |
| 13 | 31.7 | 0.9 | 15 | 16.7 | 800 | 20 | 24 | 24 | E | G | |
| 14 | 2.7 | 3 | 2 | 0.7 | 800 | <1 | 0 | 0 | B | | Comparative Example |
| 15 | 3.7 | 1.2 | 2 | 1.7 | 800 | <1 | 0 | 0 | B | | |
| 16 | 2.4 | 5 | 2 | 0.4 | 800 | <1 | 0 | 0 | B | | |
| 17 | 4.2 | 0.9 | 2 | 2.2 | 800 | <1 | 0 | 0 | B | | |
| 18 | 20 | 1.5 | 12 | 8 | 800 | 20 | 24 | 19.2 | E | E | Example |
| 19 | 7.4 | 0.9 | 3.5 | 3.9 | 600 | <1 | 0 | 0 | E | G | |
| 20 | 9 | 2 | 6 | 3 | 800 | 2000 | 20 | 20 | G | B | |
| 21 | 9 | 2 | 6 | 3 | 1000 | 60 | −10 | −10 | G | B | |
| 22 | 7.4 | 0.9 | 3.5 | 3.9 | 600 | 65 | 0 | 0 | G | B | |
| 23 | 12.5 | 1.5 | 7.5 | 5 | 800 | 20 | 24 | 12 | E | E | |
| 24 | 17.5 | 0.75 | 7.5 | 10 | 800 | 20 | 24 | 12 | E | B | |
| 25 | 34.2 | 0.3 | 7.5 | 26.7 | 800 | 60 | 24 | 12 | E | B | |
| 26 | 10 | 1 | 5 | 5 | 700 | 10 | 35 | 29.2 | E | E | |
| 27 | 10 | 1 | 5 | 5 | 800 | 2000 | 20 | 16.7 | VG | B | |

From Experimental Examples 1 and 2, it has been revealed that the plated steel sheet according to the present embodiment has high heat resistance. It has also been revealed that, in the case where the deposited amount of Cr plating, the deposited amount of Ni plating, the ratio of the deposited amount of Cr/Ni plating, and the heat treatment conditions satisfy the prescribed conditions, also long-term heat resistance is improved.

In some Examples (for example, No. 18 of Experimental Example 1 and the like), the result of the bending test was slightly worsened. As described above, the heat treatment conditions include the conditions for satisfying long-term heat resistance. In the case where the heat treatment conditions satisfy these conditions, also bendability is improved. Therefore, it is presumed that, in No. 18 of Experimental Example 1 and the like, bendability was slightly reduced because the heat treatment conditions did not satisfy these conditions. For example, in No. 18 of Experimental Example 1, since the deposited amount of Cr plating is 7.5 g/m², a preferred holding temperature is 650 to 800° C. Further, the reference time of the holding time is 50 seconds. Hence, both the holding temperature and the holding time of No. 18 are a value lower than the preferred range. Further, from Nos. 20, 21, and 27 of Experimental Example 2, it has also been revealed that long-term heat resistance is reduced in the case where at least one of the holding temperature and the holding time is larger than the preferred range.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

As described above, the plated steel sheet according to the present invention is excellent in heat resistance and adhesiveness after a high temperature test, and can be widely used as members in high-temperature environments.

The invention claimed is:
1. A plated steel sheet comprising:
   a steel sheet; and
   an alloy plating layer formed on a surface of the steel sheet,
   wherein the alloy plating layer consists of, in mass %, Cr: 5 to 91%, Fe: 0.5 to 10%, and the balance: Ni and unavoidable impurities,
   wherein the Ni concentration in the alloy plating layer gradually decreases from an outermost surface of the alloy plating layer to a side of the steel sheet,
   wherein a ratio of the Ni concentration to the Cr concentration is Ni/Cr>1 in an area extending 300 nm or more from the outermost surface of the alloy plating layer,
   the Fe concentration in the alloy plating layer gradually decreases from the side of the steel sheet to the outermost surface of the alloy plating layer,
   the Fe concentration in an area in a range of 10 nm in depth from the outermost surface of the alloy plating layer is 0.5% or less,
   a total thickness of a Cr—Fe-containing alloy layer formed in the alloy plating layer and containing Cr and Fe is 500 to 2000 nm, and a total amount of the alloy plating layer deposited to the steel sheet is 4.5 to 55.5 g/m$^2$, wherein a deposited amount of Cr plating in the alloy plating layer is 3.5 to 15.0 g/m$^2$, wherein a deposited amount of Ni plating in the alloy plating layer is 3.0 to 26.7 g/m$^2$, and wherein a ratio of the deposited amount of Cr/Ni plating in the alloy plating layer is 0.9 to 5.0.

2. The plated steel sheet according to claim 1, wherein conditions (a) and (b) below are satisfied, (a) the deposited amount of Cr plating in the alloy plating layer is more than 3.5 g/m$^2$ and 5.0 g/m$^2$ or less, and (b) at least one of a condition that the deposited amount of Ni plating in the alloy plating layer be 5.0 to 10.0 g/m$^2$ and a condition that the ratio of the deposited amount of Cr/Ni plating in the alloy plating layer be 1.2 to 3.0 is satisfied.

3. The plated steel sheet according to claim 1, wherein Cr is contained at a concentration of, in mass %, 0 to 35%, Ni at 65 to 100%, and Fe at 0.5% or less in an area extending 10 nm in depth from the outermost surface of the alloy plating layer.

4. The plated steel sheet according to claim 1, wherein the alloy plating layer includes a Ni—Cr alloy layer.

5. The plated steel sheet according to claim 1, wherein the alloy plating layer includes a Ni layer on a Ni—Cr alloy layer.

6. A method for producing a plated steel sheet that produces the plated steel sheet according to claim 1, the method comprising:

a step of performing Cr plating with an deposited amount of 1.5 to 15.0 g/m$^2$ on one surface or both surfaces of a steel sheet and thereby forming a Cr plating layer on the one surface or both surfaces of the steel sheet;

a step of performing Ni plating with an deposited amount of 3 to 26.7 g/m$^2$ on the Cr plating layer and thereby forming a Ni plating layer on the Cr plating layer; and a step of holding the steel sheet on which the Cr plating layer and the Ni plating layer are formed at a temperature of 600° C. to 900° C. for a time more than 0 seconds and 60 seconds or less in a non-oxidizing atmosphere or a reducing atmosphere.

7. The method for producing a plated steel sheet according to claim 6, wherein the deposited amount of Cr plating of the Cr plating layer is 3.5 to 15.0 g/m$^2$, the deposited amount of Ni plating of the Ni plating layer is 3.0 to 26.7 g/m$^2$, and the ratio of the deposited amount of Cr/Ni plating is 0.9 to 5.0.

8. The method for producing a plated steel sheet according to claim 7, wherein conditions (a) and (b) below are satisfied, (a) the deposited amount of Cr plating of the Cr plating layer is more than 3.5 g/m$^2$ and 15.0 g/m$^2$ or less, and (b) at least one of a condition that the deposited amount of Ni plating of the Ni plating layer be 5.0 to 10.0 g/m$^2$ and a condition that the ratio of the deposited amount of Cr/Ni plating be 1.2 to 3.0 is satisfied.

* * * * *